United States Patent
Liu et al.

(10) Patent No.: US 7,719,720 B2
(45) Date of Patent: May 18, 2010

(54) IMAGE PROCESSOR AND METHOD FOR SELECTING A PROCEDURE OF DITHERING THEREOF

(75) Inventors: Ming-Chang Liu, Chang-Hua Hsien (TW); Rei-Hong Chang, Hsin-Chu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 592 days.

(21) Appl. No.: 11/419,749

(22) Filed: May 22, 2006

(65) Prior Publication Data

US 2007/0216955 A1  Sep. 20, 2007

(30) Foreign Application Priority Data

Mar. 16, 2006  (TW) ................ 95109044 A

(51) Int. Cl.
*G06F 15/00* (2006.01)

(52) U.S. Cl. ............... 358/3.13; 358/3.05; 358/3.16
(58) Field of Classification Search ........ 358/3.05–3.32
See application file for complete search history.

(56) References Cited

U.S. PATENT DOCUMENTS

| 6,714,206 | B1 * | 3/2004 | Martin et al. ............ 345/589 |
| 2005/0069209 | A1 * | 3/2005 | Damera-Venkata et al. . 382/204 |
| 2006/0164691 | A1 * | 7/2006 | Adachi ................ 358/3.06 |

FOREIGN PATENT DOCUMENTS

CN  1809117 A  7/2006

* cited by examiner

*Primary Examiner*—Twyler L Haskins
*Assistant Examiner*—Qian Yang
(74) *Attorney, Agent, or Firm*—Winston Hsu

(57) ABSTRACT

Selecting a corresponding procedure of dithering according to a general pattern of gray levels of sub-pixels of each color of an input image. This will enable the input image to be displayed on a display with a lower bit depth.

12 Claims, 12 Drawing Sheets

IMAGE PROCESSOR AND METHOD FOR SELECTING A PROCEDURE OF DITHERING THEREOF

BACKGROUND OF THE INVENTION

1. Field of the Invention

The present invention is related to a method and a processor for image processing, and more particularly, to a method and an image processor for image dithering.

2. Description of the Prior Art

The bit numbers employed to express the respective pixels of an image, also known as the bit depth, determine the color depth of the image. In general, the visual quality of the image increases with the color depth.

The bit depth of the conventional display is limited, such as the computer monitor, the PDA display panel, and so forth. Conventionally, if the bit depth of the display is less than the color depth of the image to be displayed, then a technique is to be employed to display the image having more color depth on the display having less color depth. This technique, when applied to a display, is called dithering. For example, when a 6-bit display is utilized to display an 8-bit image, the dithering technique is employed to display the image having more color depth on the display with lower bit depth.

Before the display leaves the factory, the procedure of dithering of the display is determined and unchangeable. This means that the display processes all of the images according to the determined procedure of dithering. However, there is no procedure of dithering that is suitable for optimizing all kinds of images.

SUMMARY OF THE INVENTION

The present invention discloses a method for image dithering. The method comprises comparing gray levels of adjacent sub-pixels of the same color in each row of pixels of an image block; adjusting a first counting number if the gray levels of adjacent sub-pixels of each color in the same row of pixels present a predetermined regularity; and performing image dithering according to a procedure of dithering that corresponds to the first counting number.

The present invention also discloses an image processor. The image processor comprises an analyzing unit for receiving an input image and analyzing distribution of gray levels of a plurality of pixels of the input image, and an image dithering unit for selecting a procedure of dithering according to the analyzed distribution of the gray levels of the pixels of the input image and processing image dithering for the input image according to the selected procedure of dithering.

These and other objectives of the present invention will no doubt become obvious to those of ordinary skill in the art after reading the following detailed description of the preferred embodiment that is illustrated in the various figures and drawings.

DETAILED DESCRIPTION

The method according to the present invention selects the most proper procedure of dithering by analyzing a regularity for displaying gray levels of sub-pixels of every color of input images so as to display the images having more color depth on a display having less color depth.

Figure 1:
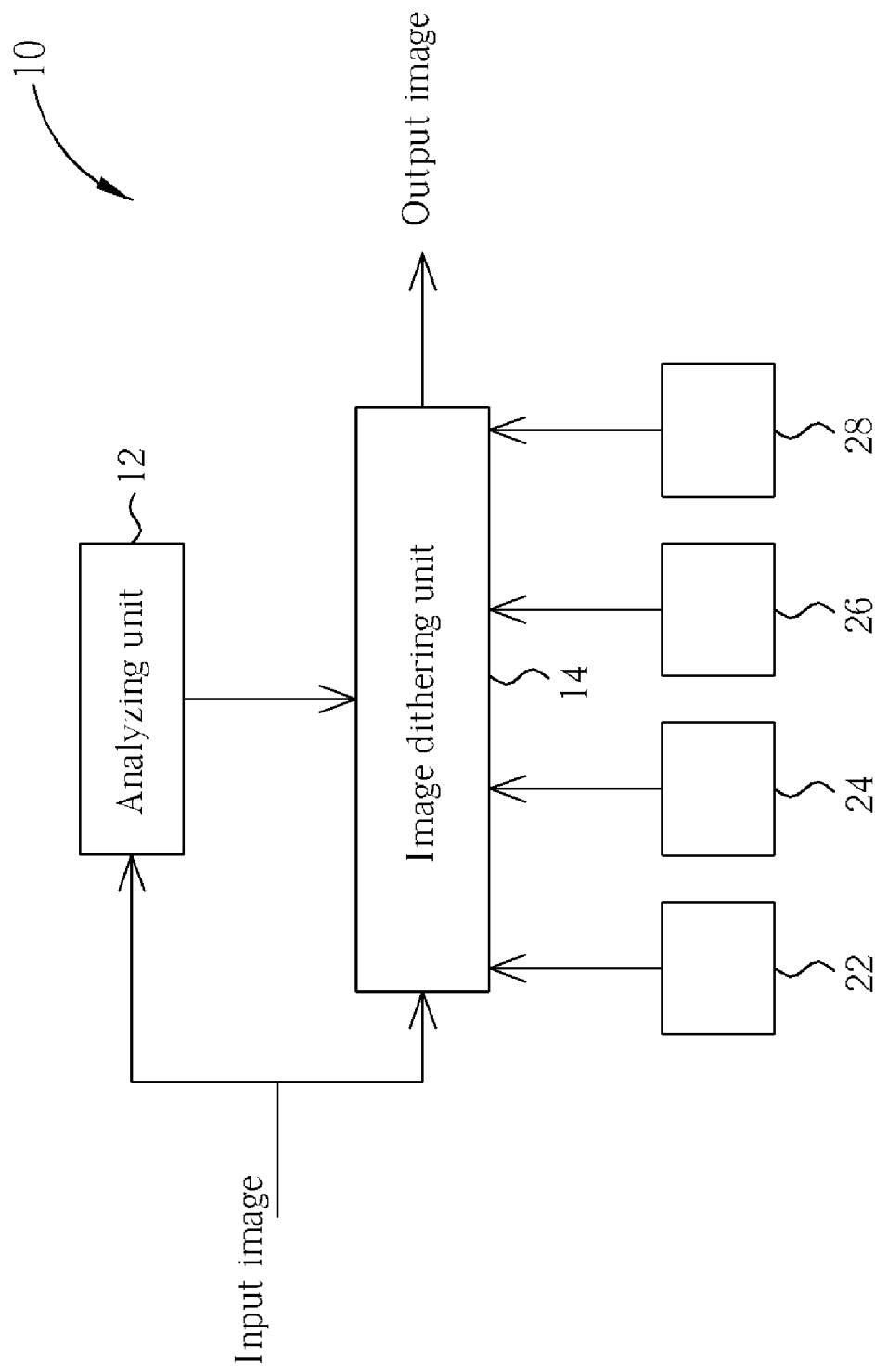
FIG. 1 is a block diagram of an image processor according to the present invention.

Please refer to FIG. 1, which is a block diagram of an image processor 10 according to the present invention. An analyzing unit 12 of the image processor 10 receives an input image and analyzes an approximately regularity for displaying gray levels of sub-pixels of every color of the input image so as to select a proper procedure of dithering for the input image. An image dithering unit 14 of the image processor 10 selects a corresponding procedure of dithering from the procedures of dithering 22-28 according to a control signal received from the analyzing unit 12.

Figure 2:
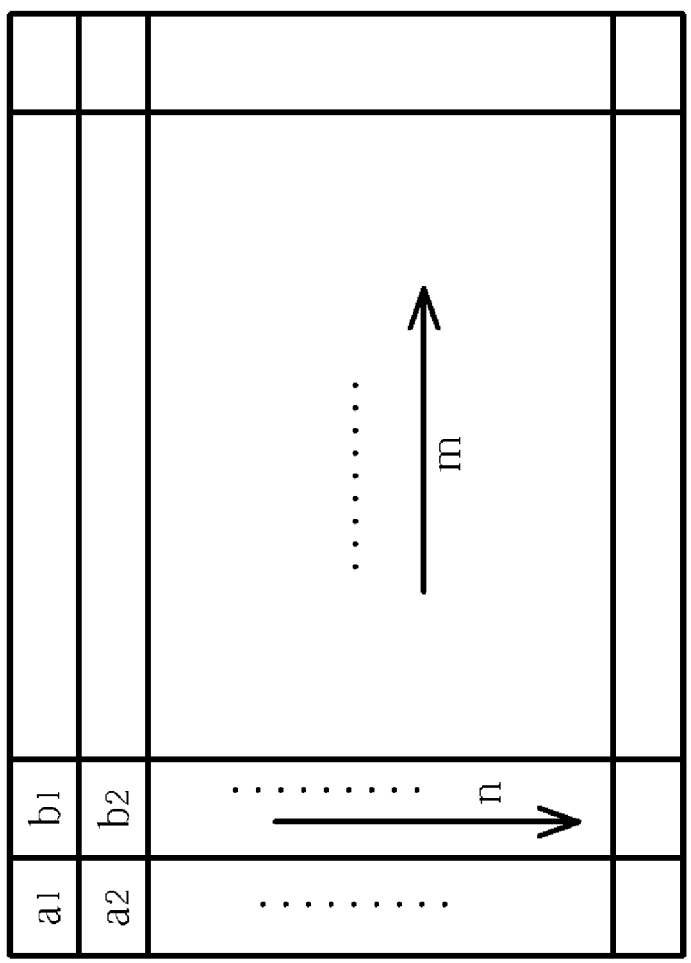
FIG. 2 is a schematic diagram of blocks of the input image indicated in FIG. 1.
Figure 3:
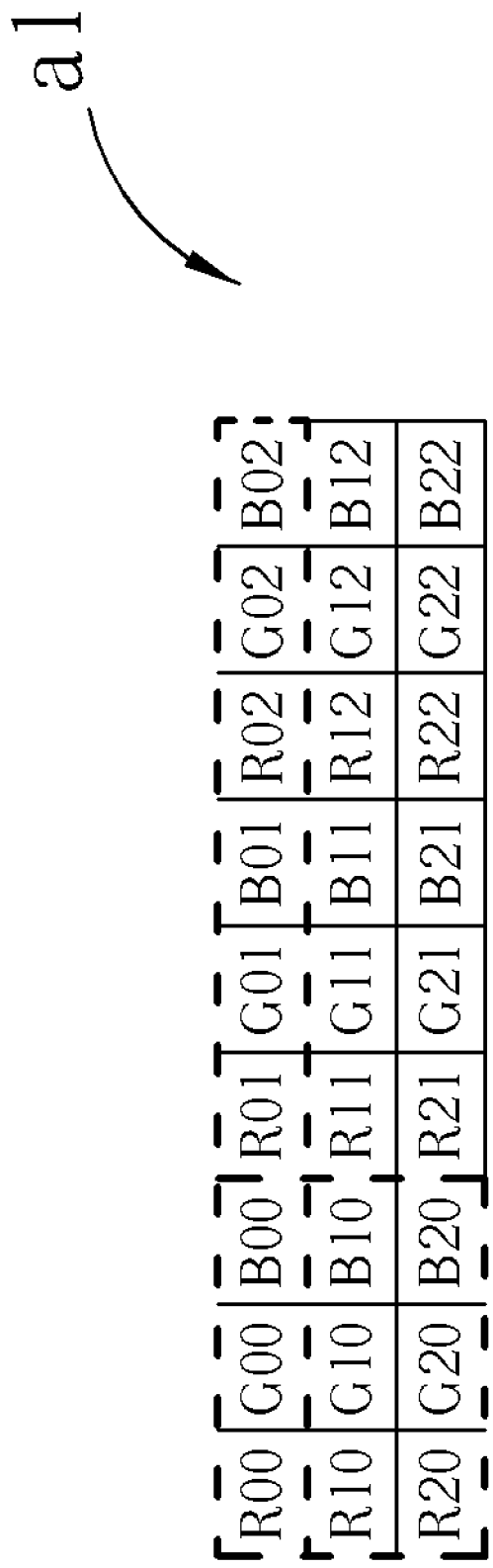
FIG. 3 is a schematic diagram of a block shown in FIG. 2.

Please refer to FIGS. 2-3. FIG. 2 is a schematic diagram of blocks of the input image indicated in FIG. 1, and FIG. 3 is a schematic diagram of a block a1 shown in FIG. 2. The input image is separated into a plurality of blocks, and each of the blocks comprises a plurality of pixels as shown in FIG. 3. The block a1 comprises a plurality of pixels, and each of the pixels is composed of three sub-pixels R, G, and B. For example, the three sub-pixels R00, G00, and B00 represent a pixel. The analyzing unit 12 of the image processor 10 analyzes the gray levels of adjacent pixels in each row and in each column.

The following description will explain how to analyze the gray levels of adjacent pixels. Take the first row of pixels shown in FIG. 3 for example. The analyzing unit 12 compares the three pixels (R00,G00,B00), (R01,G01,B01), and (R02, G02,B02) with each other. If the gray levels of the sub-pixels of each color are ascending or descending from the left to the right, the three pixels are in a horizontal gray level status. When the gray levels of the sub-pixels of each color are ascending from the left to the right, the gray levels of the sub-pixels obey the three following rules:

R02>R01>R00;
G02>G01>G00; and
B02>B01>B00.

On the other hand, when the gray levels of the sub-pixels of each color are descending from the left to the right, the gray levels of the sub-pixels obey the three following rules:

R02<R01<R00;
G02<G01<G00; and
B02<B01<B00.

If the gray levels of the sub-pixels of each color in the same row of pixels are the same, the three pixels are in a single horizontal gray level status, and the gray levels of the sub-pixels obey the three following rules:

R02=R01=R00;
G02=G01=G00; and
B02=B01=B00.

Similarly, take the first column of pixels shown in FIG. 3 for example. The analyzing unit 12 compares the three pixels (R00,G00,B00), (R10,G10,B10), (R20,G20,B20) with each other. If the gray levels of the sub-pixels of each color are ascending or descending from the top to the bottom, the three pixels are in a vertical gray level status. When the gray levels of the sub-pixels of each color are ascending from the top to the bottom, the gray levels of the sub-pixels obey the three following rules:

R20>R10>R00;
G20>G10>G00; and
B20>B10>B00.

When the gray levels of the sub-pixels of each color are descending from the top to the bottom, the gray levels of the sub-pixels obey the three following rules:

R20<R10<R00;
G20<G10<G00; and
B20<B10<B00.

If the gray levels of the sub-pixels of each color in the same column of pixels are the same, the three pixels are in a single vertical gray level status, and the gray levels of the sub-pixels obey the three following rules:

R20=R10=R00;
G20=G10=G00; and
B20=B10=B00.

It is noted that the number of each set of adjacent pixels for analysis of the analyzing unit 12 is not limited to 3. The number of each set of adjacent pixels can be 4 or other numbers.

Figure 4:
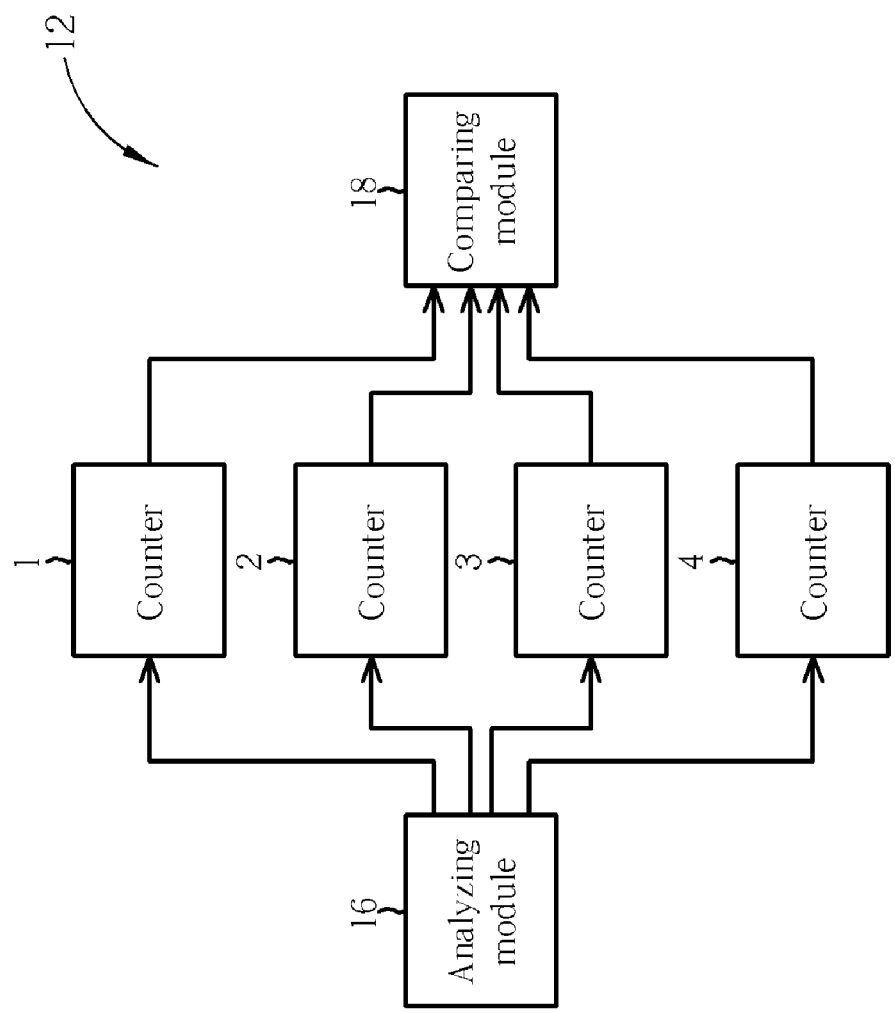
FIG. 4 is a block diagram of the analyzing unit shown in FIG. 1.

Please refer to FIG. 4, which is a block diagram of the analyzing unit 12. The analyzing unit 12 comprises an analyzing module 16, a comparing module 18, and a plurality of counters 1-4. The analyzing module 16 analyzes whether the statuses of the adjacent pixels in the block a1 are the horizontal gray level status, the vertical gray level status, the single horizontal gray level status, or the single vertical gray level status according to the method previously mentioned. The four counters 1-4 count the numbers of sets of three adjacent pixels that are respectively in the horizontal gray level status, in the vertical gray level status, in the single horizontal gray level status, and in the single vertical gray level status. The counter 1 counts the number of sets of three adjacent pixels in the vertical gray level status and corresponds to the procedure of dithering 22. The counter 2 counts the number of sets of three adjacent pixels in the horizontal gray level status and corresponds to the procedure of dithering 24. The counter 3 counts the number of sets of three adjacent pixels in the single vertical gray level status and corresponds to the procedure of dithering 26. The counter 4 counts the number of sets of three adjacent pixels in the single horizontal gray level status and corresponds to the procedure of dithering 28. When the counters 1-4 finish counting the numbers, the comparing module 18 of the analyzing unit 12 compares the four numbers counted by the counters 1-4 to determine which number is the greatest number of the four numbers. If the number counted by the counter 1, i.e. the number of sets of three adjacent pixels in the vertical gray level status, is the greatest number of the four numbers, the analyzing unit 12 sends a control signal to control the image dithering unit 14 to select the procedure of dithering 22 and execute the procedure of dithering 22 for the block a1.

Of course, the number that the analyzing unit 12 controls the image dithering unit 14 to select the proper procedure of dithering is not limited to the greatest number of the four numbers counted by the counters. The number can be the least number of the four numbers. Moreover, the analyzing unit 12 may control the image dithering unit 14 to select the proper procedure of dithering according to a relationship of the four numbers. Therefore, the kinds and the number of the procedures of dithering are various with the analysis methods.

In addition, if the image processor 10 comprises a frame buffer, the data of the input image can be stored in the frame buffer and then the image processor 10 processes the stored data of the frame buffer. In such case, the counter 4 of the analyzing unit 12 can be omitted, and the counter 3 is used to count the number of sets of three pixels in the single vertical gray level status and the number of sets of three pixels in the single horizontal gray level status.

Moreover, when the image processor 10 performs image dithering for the input image, all blocks of the input image can be performed according to the same procedure of dithering, or each of the blocks of the input image can be performed according to a corresponding procedure of dithering, or some adjacent blocks of the input image can be performed according to the same procedure of dithering.

Figure 5:
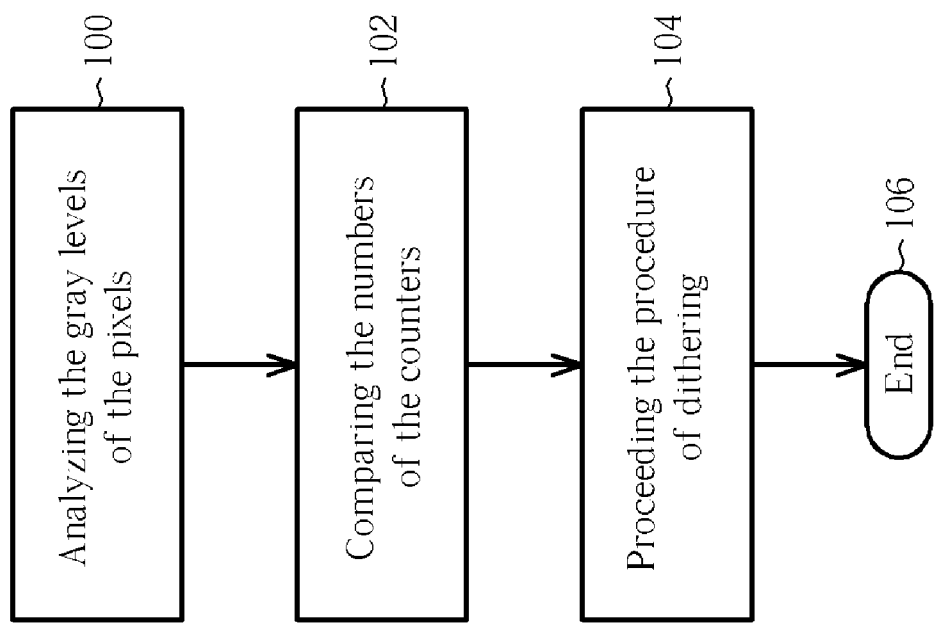
FIG. 5 is a flow chart when the image processor shown in FIG. 1 performs image dithering according to the present method.
Figure 6:
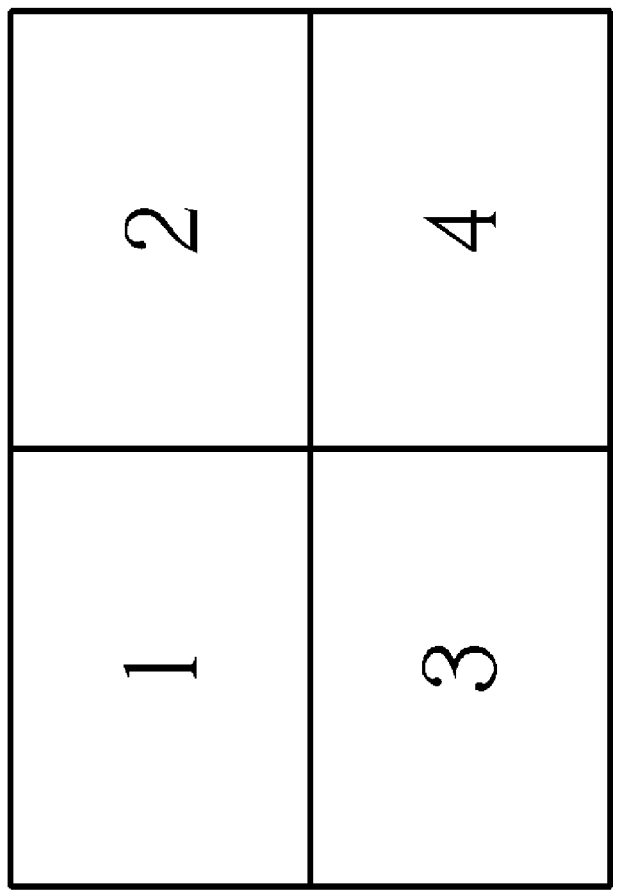
FIGS. 6-9 illustrate sequences respectively for performing the procedures of dithering.
Figure 7:
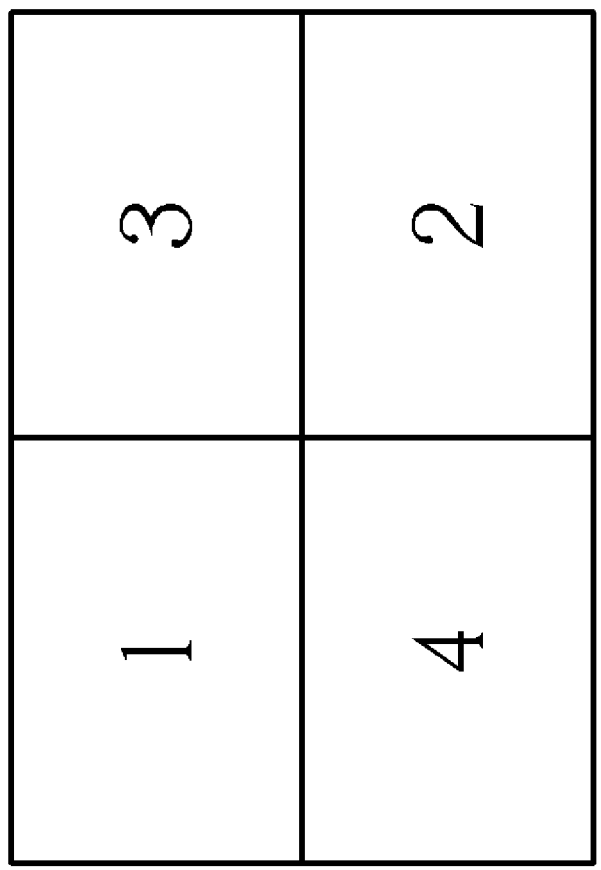
Figure 8:
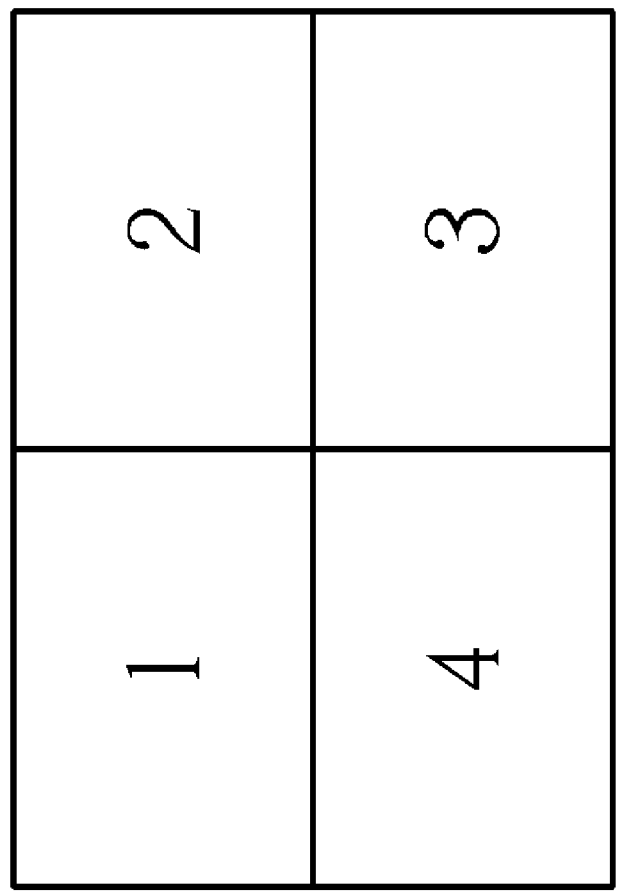
Figure 9:
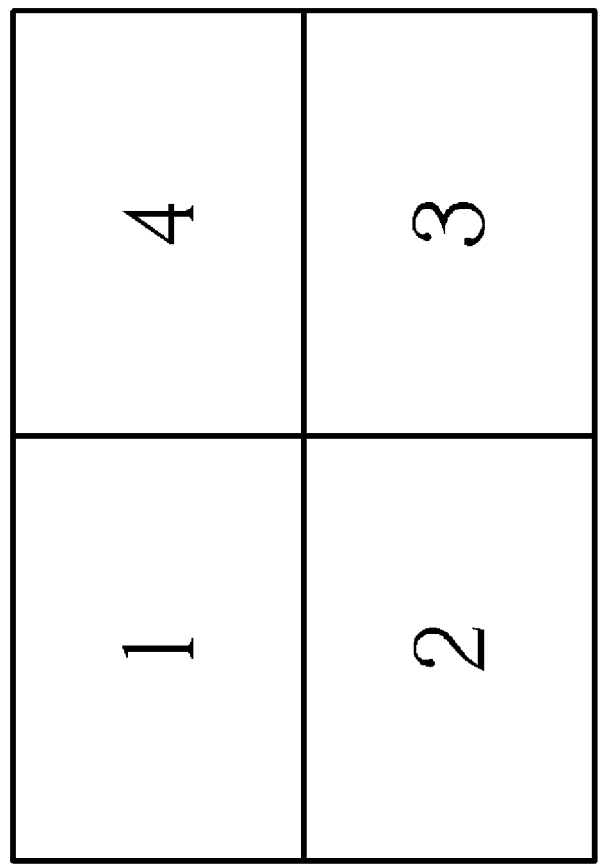

Please refer to FIG. 5, which is a flow chart when the image processor 10 performs image dithering according to the present method. The method comprises following steps:

Step 100: The analyzing module 16 of the analyzing unit 12 analyzes each set of pixels of the block a1 whether the block a1 is in the horizontal gray level status, in the vertical gray level status, in the single horizontal gray level status, or in the single vertical gray level status and adjusts the corresponding numbers counted by the counters 1-4;

Step 102: The comparing module 18 of the analyzing unit 12 compares the four numbers counted by the counters 1-4 to control the image dithering unit 14 to select the corresponding one of the procedures of dithering 22-28;

Step 104: The image dithering unit 14 selects the corresponding procedure of dithering and performs the corresponding procedure of dithering for the input image; and Step 106: End.

Figure 10:
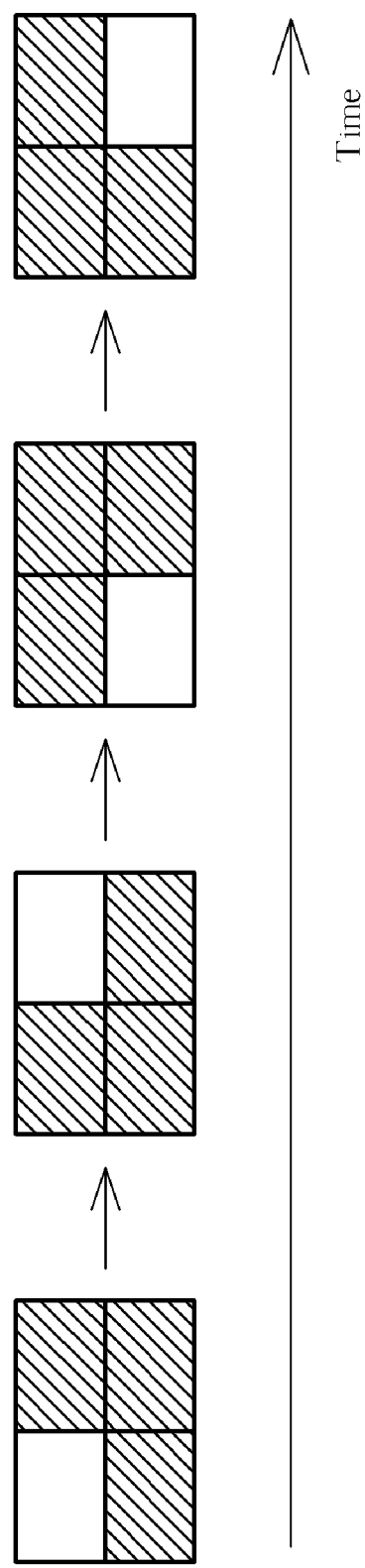
FIGS. 10-12 illustrate the processes when the block displays image.
Figure 11:
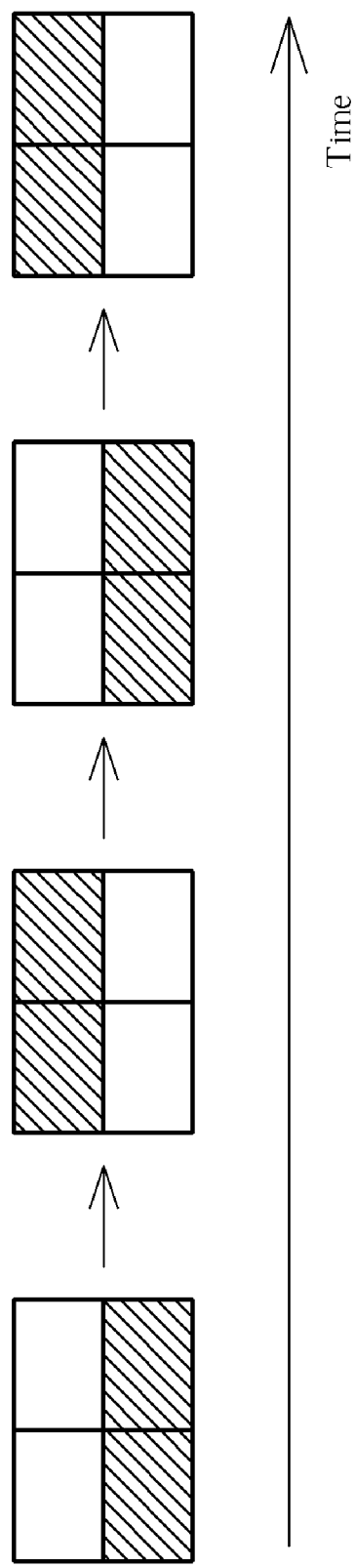
Figure 12:
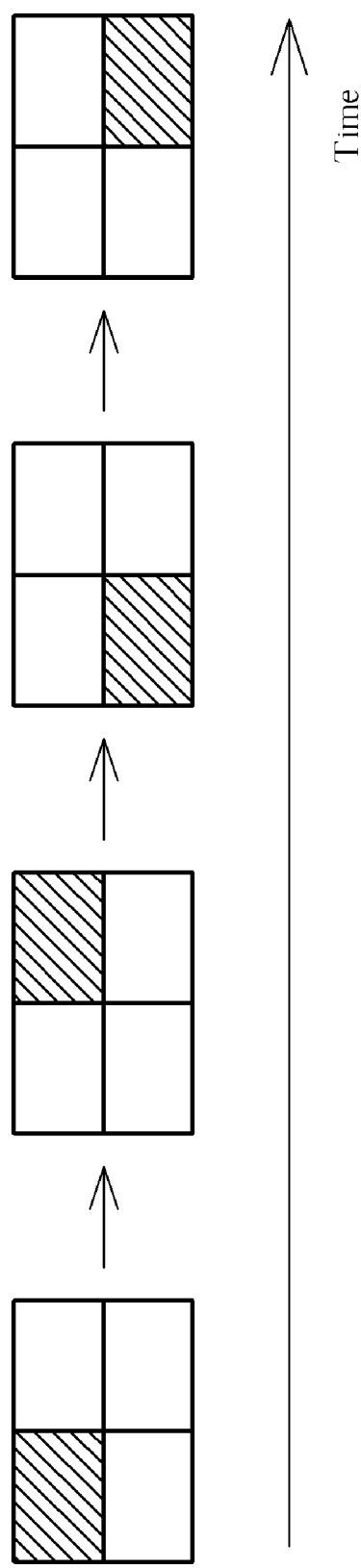

Please refer to FIGS. 6-9. FIGS. 6-9 illustrate sequences respectively for performing the procedures of dithering 22-28. Each of the blocks represents a pixel, and the numbers 1-4 indicated the display sequence of the image data. Suppose that a 6-bit display is utilized to display an 8-bit image according to the remainders, i.e. the two least significant bits (LSB), to present the image data. For example, if the remainder is equal to 1, the sequence of the pixels to display is 1→2→3→4. If the remainder is equal to 2, the sequence of the pixels to display is (1, 2)→(3, 4). If the remainder is equal to 3, the sequence of the pixels to display is (2, 3, 4)→(1, 3, 4)→(1, 2, 4)→(1, 2, 3). Please refer to FIGS. 10-12. FIGS. 10-12 illustrate the processes when the block displays image according to the procedure of dithering 22 as the remainder is respectively equal to 1, 2, and 3. The blank areas are indicated that corresponding pixels are turned on, and the hatched areas indicate that corresponding pixels are turned off.

It is noted that the procedures of dithering of the present invention are not limited to the procedures of dithering 22-28 indicated in FIGS. 6-9. Other procedures of dithering also can be adopted for image dithering.

In contrast with the prior art, the present invention discloses a method for image dithering and a related image processor that precede a procedure of dithering according to a general pattern of gray levels of sub-pixels of each color of an input image. This will enable the input image to be displayed on a display with a lower bit depth.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for image dithering, comprising:
comparing gray levels of adjacent sub-pixels of the same color in each row of pixels of an image block;

adjusting a first counting number if the gray levels of adjacent sub-pixels of each color in the same row of pixels are in ascending order or in descending order; and performing image dithering in temporal domain according to least significant bits of the gray levels of the pixels of the image block according to a procedure of dithering that corresponds to the first counting number.

2. The method of claim 1 further comprising:

comparing gray levels of adjacent sub-pixels of the same color in each column of pixels of the image block; and adjusting a second counting number if the gray levels of adjacent sub-pixels of each color in the same column of pixels present a predetermined regularity.

3. The method of claim 2 further comprising performing image dithering in temporal domain according to the least significant bits of the gray levels of the pixels of the image block according to a procedure of dithering that corresponds to the second counting number.

4. The method of claim 2 further comprising comparing the first counting number with the second counting number.

5. The method of claim 1 wherein adjusting the first counting number if the gray levels of adjacent sub-pixels of each color in the same row of pixels are in ascending order or in descending order comprises adjusting the first counting number if the gray levels of adjacent sub-pixels of each color in the same row of pixels are the same.

6. The method of claim 5 further comprising:

comparing gray levels of adjacent sub-pixels of the same color in each column of pixels of the image block; and adjusting the first counting number if the gray levels of adjacent sub-pixels of each color in the same column of pixels are the same.

7. A method for image dithering, comprising:

comparing gray levels of adjacent sub-pixels of the same color in each row of pixels of an image block;

adjusting a first counting number if the gray levels of adjacent sub-pixels of each color in the same row of pixels present a first predetermined regularity;

comparing gray levels of adjacent sub-pixels of the same color in each column of pixels of the image block;

adjusting a second counting number if the gray levels of adjacent sub-pixels of each color in the same column of pixels present a second predetermined regularity; and performing image dithering in temporal domain according to least significant bits of the gray levels of the pixels of the image block according to the first counting number and the second counting number.

8. The method of claim 7 wherein adjusting the first counting number if the gray levels of adjacent sub-pixels of each color in the same row of pixels present the first predetermined regularity comprises adjusting the first counting number if the gray levels of adjacent sub-pixels of each color in the same row of pixels are in ascending order or in descending order, and adjusting the second counting number if the gray levels of adjacent sub-pixels of each color in the same column of pixels present the second predetermined regularity comprises adjusting the second counting number if the gray levels of adjacent sub-pixels of each color in the same row of pixels are the same.

9. The method of claim 7 wherein adjusting the first counting number if the gray levels of adjacent sub-pixels of each color in the same row of pixels present the first predetermined regularity comprises adjusting the first counting number if the gray levels of adjacent sub-pixels of each color in the same row of pixels are the same, and adjusting the second counting number if the gray levels of adjacent sub-pixels of each color in the same column of pixels present the second predetermined regularity comprises adjusting the second counting number if the gray levels of adjacent sub-pixels of each color in the same row of pixels are in ascending order or in descending order.

10. The method of claim 7 further comprising comparing the first counting number with the second counting number.

11. An image processor comprising:

an analyzing unit, comprising:

a plurality of counters;

an analyzing module, for comparing gray levels of adjacent sub-pixels of the same color in each row or column of pixels of an image block, and adjusting values of corresponding values of the plurality of counters if the gray levels of adjacent sub-pixels of each color in the same row or column of pixels are in ascending order or in descending order; and a comparing module, for generating a comparing result according to the values of the plurality of counters; and an image dithering unit for performing image dithering in temporal domain according to least significant bits of the gray levels of the pixels of the image block and the comparing result.

12. The image processor of claim 11, wherein the analyzing module of the analyzing unit is further utilized for adjusting the values of the corresponding values of the plurality of counters if the gray levels of adjacent sub-pixels of each color in the same row or column the image block are the same.

* * * * *